Figure 1:
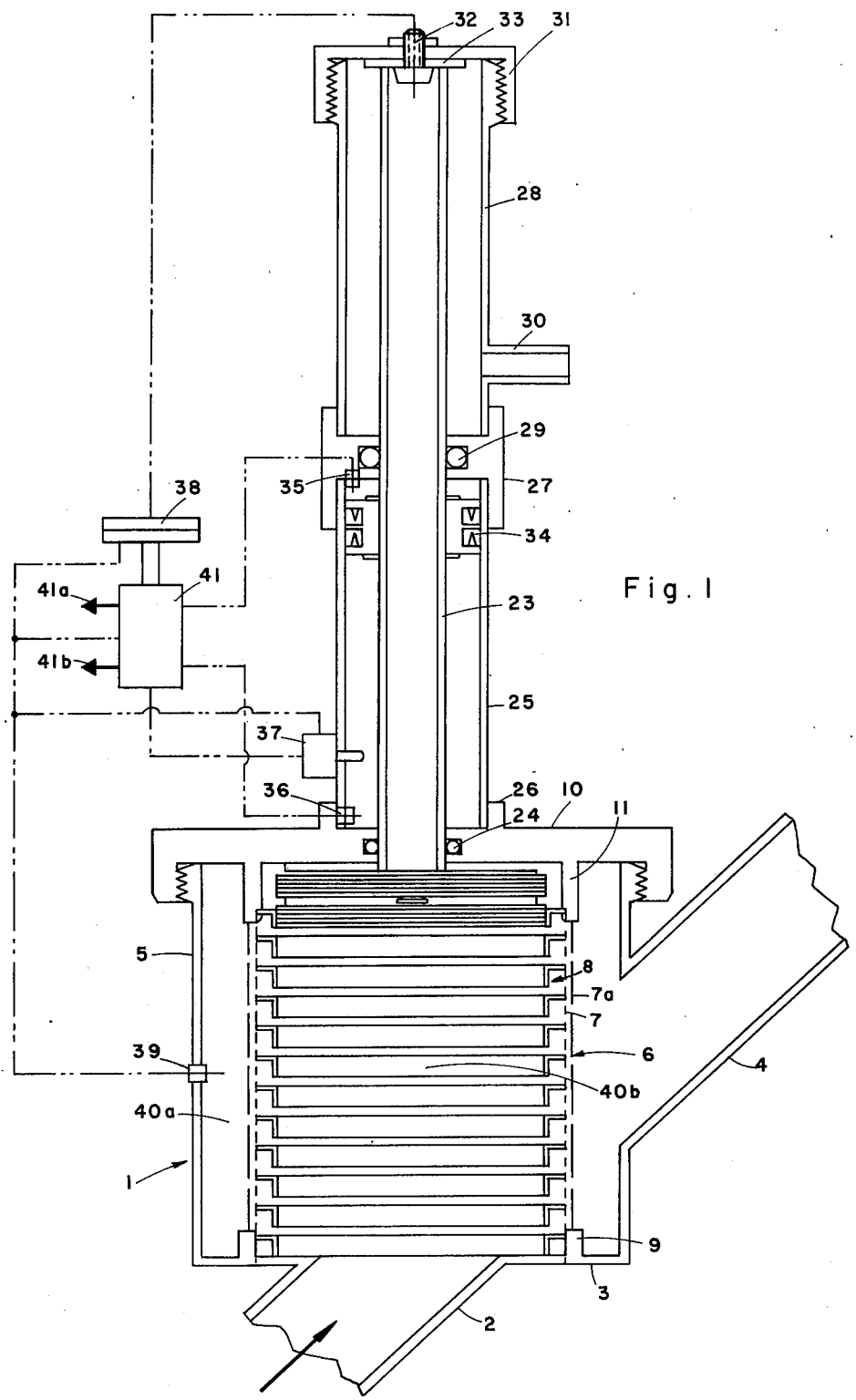

United States Patent [19]

Mehoudar

[11] 4,156,651
[45] May 29, 1979

[54] SELF-CLEANING FILTRATION DEVICE

[75] Inventor: Raphael Mehoudar, Tel Aviv, Israel

[73] Assignee: Hydro Plan Engineering Ltd., Tel-Aviv, Israel

[21] Appl. No.: 916,210

[22] Filed: Jun. 16, 1978

[30] Foreign Application Priority Data

Jun. 16, 1977 [IL] Israel ......................................... 52332

[51] Int. Cl.$^2$ ............................................ B01D 25/16
[52] U.S. Cl. ................................. 210/108; 210/412; 210/488
[58] Field of Search ............... 210/108, 155, 161, 162, 210/411, 412, 488

[56] References Cited

U.S. PATENT DOCUMENTS

| | | | |
|---|---|---|---|
| 2,338,418 | 1/1944 | Forrest et al. | 210/412 |
| 2,338,419 | 1/1944 | Forrest et al. | 210/412 |
| 3,853,762 | 12/1974 | Moatti | 210/108 |
| 3,994,810 | 11/1976 | Schaeffer | 210/108 X |

*Primary Examiner*—John Adee
*Attorney, Agent, or Firm*—Browdy and Neimark

[57] ABSTRACT

A self-cleaning filtration device comprising a casing; a device inlet and a device outlet formed integrally with said casing; a cylindrical filter structure mounted in said casing and defining an inner zone in communication with said device inlet, and also defining with the adjacent walls of the casing an outer zone in communication with said device outlet whereby all flow from said device inlet to said device outlet passes through said filter structure, said structure including an axial stack of annular support elements, each support element comprising a flange portion and an inwardly located axially directed skirt portion, and a sleeve-like filter element surrounding said axial stack and bearing against the outermost edges of said flange portions, at least one plunger body reciprocatably displaceable in said filter structure and including a pair of axially spaced apart sealing rings of such axial extent and respective axial separation as to ensure that at all times sealing contact is maintained between said rings and a pair of successive skirt portions and so as to define with each such successive pair of skirt portions, a backflow chamber substantially sealed from said inner zone; communication means associated with said plunger element for rendering said chamber in communication with a backflow outlet so as to allow for backflow from said outer zone through the filtering structure via said chamber to the backflow outlet and displacing means for reciprocatably displacing said plunger body in said structure.

11 Claims, 3 Drawing Figures

SELF-CLEANING FILTRATION DEVICE

This invention relates to a self-cleaning filtration device of the kind generally incorporated in feed water lines so as to filter out undesired impurities. Such self-cleaning filtration devices are so designed as to provide for continuous or intermittent cleaning of the device so as to prevent it from getting blocked with the filtered out impurities.

The invention is particularly concerned with a self-cleaning filtration device comprising a casing; a device inlet and a device outlet formed integrally with casing; a cylindrical filter unit mounted in the casing and defining an internal zone, in communication with the device inlet, and also defining with the adjacent walls of the casing an outer zone in communication with the device outlet whereby all flow from the device inlet to the device outlet passes through the filter unit.

With such self-cleaning filtration devices various means have been proposed for effecting cleaning of the filter unit including, for example, reciprocatingly displacing one or more brushes with respect to the filter unit with a view to brushing away impurities, etc. which have become attached to the unit. Alternatively it has been proposed to arrange for feed water to pass along the length of the unit in the hope that this feed water will detach and carry away impurities which have become attached to the filter unit. A still further alternative form of cleaning which has been proposed is to arrange for a back-flow of feed water, i.e. a flow in a direction opposite to that of the normal filtering flow of the water through the unit, this back-flow causing the effective detachment and flushing away of impurities which have become attached to the filter unit. It is particularly in connection with such filtration devices wherein means are provided for effecting such a self-cleaning backflow that the present invention is particularly concerned.

U.S. Patent Specification No. 3,994,810 (Schaeffer) discloses such a self-cleaning filtration device comprising a housing having an inlet and an outlet; a stack of individual separate annular filter elements mounted on an apertured tubular post so as to define with said housing an outer zone in communication with the device outlet and, within the post, an inner zone in communication with the device inlet, whereby all flow from said device inlet to said device outlet passes through said post apertures and said filter elements; at least two pistons secured to a hollow connecting piston rod and slidably mounted in the interior of the post, each piston having by-pass passages arranged to communicate with said post apertures so as to provide a fluid passage from the outer zone through the filter element to the connecting rod, displacing means for reciprocatably displacing said pistons and rod within said post and means for allowing for backflow from said outer zone through each filter element and post apertures to said connecting rod.

The present invention is directed to an improvement in such filtration devices which improvement leads to the production of an economical device which can be readily serviced.

According to the present invention there is provided a self-cleaning filtration device comprising a casing; a device inlet and a device outlet formed integrally with said casing; a cylindrical filter structure mounted in said casing and defining an inner zone in communication with said device inlet, and also defining with the adjacent walls of the casing an outer zone in communication with said device outlet whereby all flow from said device inlet to said device outlet passes through said filter structure, said structure including an axial stack of annular support elements, each support element comprising a flange portion and an inwardly located axially directed skirt portion, and a sleeve-like filter element surrounding said axial stack and bearing against the outermost edges of said flange portions, at least one plunger body reciprocatably displaceable in said filter structure and including a pair of axially spaced apart sealing rings of such axial extent and respective axial separation as to ensure that all times sealing contact is maintained between said rings and a pair of successive skirt portions and so as to define with each such successive pair of skirt portions, a back-flow chamber substantially sealed from said inner zone; comunication means associated with said plunger element for rendering said chamber in communication with a back-flow outlet so as to allow for backflow from said outer zone through the filtering structure via said chamber to the back-flow outlet and displacing means for reciprocatably displacing said plunger body in said structure.

The filtration device in accordance with the present invention, using as it does a simple continuous sleeve-like filter element which is independently supported by the stack of annular support elements, constitutes a very simple structure wherein the filter elements can be easily removed for servicing and/or replacement. This is in contradistinction to the device as disclosed by Schaeffer wherein the filter is constituted by a plurality of separate filter elements mounted on a tubular support post which is radially apertured, each filter element being constituted by pleated filter media material mounted between support rings and having an inlet and an outlet. Such filter elements are in themselves considerably more expensive than the simple sleeve element in accordance with the invention and their assembly and disassembly for the purpose of servicing and/or replacement is time consuming and troublesome.

Furthermore, the pistons disclosed by Schaeffer perform their cleaning action by sliding on the inner post surface and all the cleaning backflow has in this case to pass through the limited post apertures. In the case of the device in accordance with the present invention, however, no such limitation exists and the flushing liquid and entrained solid matter can pass without hindrance to the backflow chamber.

Also, with the Schaeffer construction, the disposition of one of the pistons O-rings opposite a post aperture renders ineffective the sealing of the backflow chamber. Such a possibility is avoided in accordance with the present invention wherein, at all times, sealing is effected between a pair of successive skirt portions.

Furthermore, the particular construction of the support elements and the fact that the plunger element only makes sealing contact with the skirt portions which are inwardly displaced with respect to the filter element obviates the danger that the filter element may become damaged by grit or the like which could otherwise be moved across the filter element by the plunger element. This allows for the use of a relatively cheap non-robust filter element material.

Preferably there are defined in the body backflow passages. In accordance with a preferred embodiment there is provided a tubular plunger rod secured to the plunger body and communicating at one end thereof with said back-flow passages, a fixed sealing surface being adapted to bear against and seal the opposite end of the plunger rod against fluid outflow therefrom when the plunger body is in one of its terminal positions, said opposite end becoming unsealed and in communication with said outlet in all other positions of said plunger body.

Preferably the displacing means comprises a hydraulic motor, said plunger rod being slidable in a cylinder formed integrally with said casing, a piston element formed integrally with said rod, hydraulic liquid ports formed in said cylinder on opposite sides of said piston element and coupled to said outer zone, flow and valve means for controlling hydraulic flow to and from one or other of said ports. Thus the tubular plunger rod serves as a virtual hydraulic control valve controlling the initiation and termination of the flushing backflow hydraulic control valve which would otherwise be called for.

Figure 2:
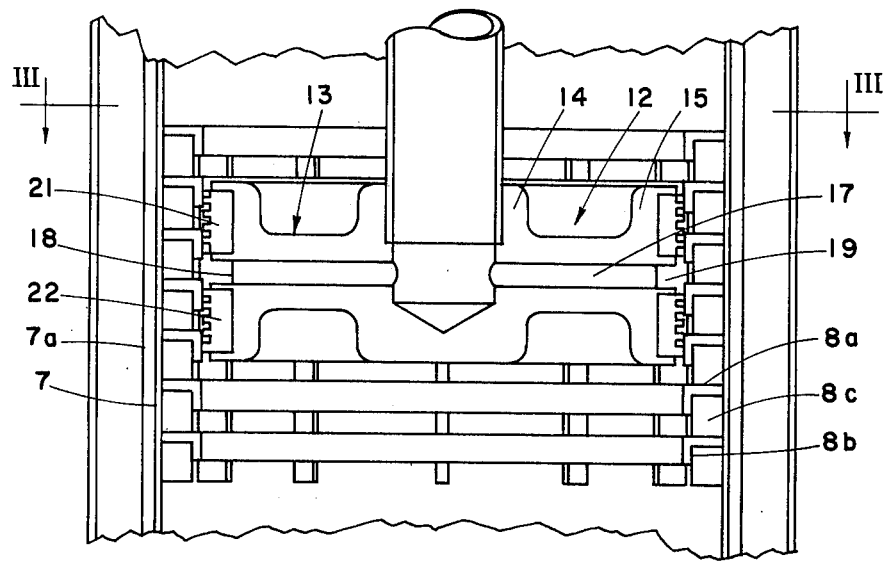
Figure 3:
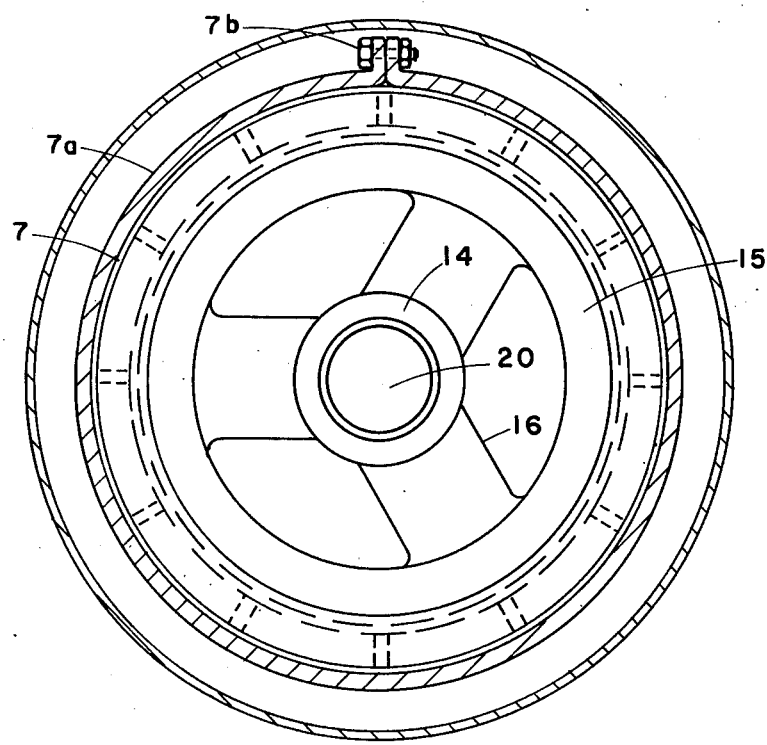

One embodiment of a self-cleaning filtration device in accordance with the present invention will now be described by way of example and with reference to the accompanying drawings in which:

FIG. 1 is a longitudinally sectioned view of the device in accordance with the present invention, FIG. 2 is a view on an enlarged scale of a detail of the device shown in FIG. 1, and FIG. 3 is a cross-sectional view of the device shown in FIG. 2 taken along the line III—III.

As seen in the drawings the self-cleaning filtration device comprises a cylindrical casing 1 having an angularly located inlet 2 set into one end face 3 of the casing and an angularly located outlet 4 set into the cylindrical wall 5 of the casing. A cylindrical filter unit 6 is coaxially mounted within the casing 1 and comprises a cylindrical gauze sleeve 7 which surrounds an axial stack of annular rings 8. The sleeve 7 is clamped to the stack by means of a perforated clamping sleeve 7a which is firmly clamped to the stack by means of clamping bolts 7b. Each ring 8 comprises an inwardly directed flange 8a and a downwardly directed cylindrical skirt 8b, the outer edge of the flange 8a being in substantially sealing contact with the cylindrical gauze wall 7. Depending downwardly from the flange 8a are radially directed legs 8c, successive rings 8 being supported with respect to each other by their legs 8c. The lowermost ring 8 is located within an annular boss 9 formed on the inner surface of the end face 3. The upper end of the casing is provided with a cylindrical screw-on end cap 10 having a downwardly extending boss 11 which abuts and serves to locate the uppermost ring 8.

A plunger element 12 (seen clearly and in detail in FIGS. 2 and 3) is reciprocatable within the filter unit 6 and comprises a plunger body 13 consisting of a central hub 14 and an outer annulus 15 connected together by integrally formed radial portions 16 in which are defined radial passages 17. These radial passages 17 communicate at the outer end thereof via apertures 18 with a peripheral groove 19 formed in the cylindrical outer wall of the annulus 15. The passages 17 communicate at their inner ends with a central recess 20 formed in the hub 14.

A pair of axially spaced apart sealing rings 21 and 22 are set into the outer cylindrical wall of the annulus 15 being separated by the peripheral groove 19.

A tubular plunger rod 23 is secured at one end thereof to the plunger body 13 by being force fitted into the recess 20, the plunger rod 23 extending slidably and sealingly through a central aperture formed in the end cap 10 via a sealing ring 24. The plunger rod 23 extends into and out of a cylinder 25 which is secured at one end to a boss 26 extending out of the end cap 10. The upper end of the cylinder 25 is coupled via a coupling element 27 with a tubular cylinder extension 28 into which the plunger rod 23 extends via a sealing ring 29 formed in the coupling element 27. The cylinder extension 28 is formed with a backflow outlet 30 and is provided at its end remote from the coupling unit 27 with a screw cap 31 in which is set a coupling grommet 32 having a peripheral sealing surface 33.

The plunger rod 23 is provided with a piston element 34 sealingly slidable within the cylinder 25 upon reciprocation of the plunger rod 23.

The cylinder 25 is formed, at opposite ends thereof, and on either side of the piston element 35 with throughflow ports 35 and 36.

Set into the cylinder 25 close to the cover cap 10 is a limit valve switch 37.

A pressure sensitive membrane switch 38 is coupled on the one hand to the coupling grommet 32 and, on the other hand via a coupling port 39 set into the wall of the casing with an outer zone 40a defined between the casing wall and the filter unit which outer zone 40a is in communication with the device outlet 4. The filter unit 6 defines therein an inner zone 40b in communication with the device inlet 2.

A two-position, five-way valve 41 is responsively coupled to the membrane switch 38, the ports 35 and 36, the limit switch 37 and the port 39. Additionally the valve is provided with a pair of exhaust outlets 41a and 41b.

In use, the filtration device is connected in a feed pipeline (not shown), feed water passing into the device via the device inlet 2 and into the inner zone 40b. The water passes through the filter unit 6, being filtered thereby, and into the outer zone 40a and from there out of the device via the device outlet 4.

As can be clearly seen in FIG. 1 of the drawings the plunger element 12, when in its uppermost position, is slightly spaced from the adjacent surface of the end cap 10 whilst the sealing ring 21 does not abut any annular ring 8. On the other hand the upper edge of the tubular plunger rod 23 abuts sealingly the bearing surface 33. In consequence the inner zone 40b is in communication with the interior of the tubular plunger rod 23 and the liquid pressure in the inner zone 40b is transmitted, via the grommet 32, to one side of the membrane switch 38 the other side of which is coupled via the port 39 with the outer zone 40a.

As long as the pressures between the internal and outer ones 40b and 40a are substantially equal, i.e. there is free liquid flow through the filtering wall 7, the valve 31 is maintained in a first position whereby the port 36 communicates via the valve 41 and the port 39 with the outer one 40a. In consequence the region of the cylinder 25 below the piston 34 is in effective communication with the outer zone 40a whilst the region of the cylinder 25 above the piston 34 communicates via the port 35 and the valve 41 with the exhaust outlet 41a of the valve 41. In consequence, and in the normal operational condition of the device, i.e. where no effective blockage of the filter unit 6 has taken place, the plunger element 12 is maintained in its uppermost position as seen in FIG. 1 of the drawings.

Should now the filter unit 6 become blocked to any significant degree, a pressure differential develops between the inner and outer zones 40b and 40a, this pressure differential acts on the membrane switch 38 and in consequence the valve 41 is switched into a second position, as a result of which the port 35 is placed into communication with the outer zone 40a via the port 39 whilst the port 36 is placed into communication with one of the exhaust outlet 41b of the valve 41. The consequent fluid pressure acting on the upper surface of the piston 34 causes the piston to move downwardly carrying with it the plunger rod 23 and the plunger element 12. With this downward movement the upper end of the plunger rod 23 moves away from the sealing surface 33 thereby opening up the rod 23 for the throughflow of flushing liquid.

In its downward movement and, as successive skirts 8b are sealingly and respectively engaged by sealing rings 21 and 22, successive backflow chambers are defined, each backflow chamber comprising the region between the successive rings 8, the peripheral groove 19 and the radial passages 17. Each backflow chamber communicates, via the interior of the plunger rod 23, with the interior of the cylinder extension 28 (the upper edge of the plunger rod having now been disengaged from sealing engagement with the bearing surface 33) and with the backflow outlet 30.

In view of the fact that the water pressure in the outer zone 40a now exceeds the pressure in the thus formed backflow chamber, water backflow will take place from the outer zone 40z through the filtering sleeve 7 of the backflow chamber, this back-flow carrying with it impurities such as grit, etc. which have become lodged on the filtering sleeve 7, the backflowing liquid together with the entrained grit, etc. passing out through the tubular plunger rod 23, extension cylinder 28 so as to be discharged through the back-flow outlet 30.

This procedure of defining successive back-flow chambers and the consequent creation of a back-flow through the filtering wall 7 of these chambers continues until the piston 34 contacts the limit switch 37 (at which stage the plunger element 12 is located at the downward limit of its stroke). As a consequence of this contacting of the limit switch 37 the valve 41 is returned to its first positon with the port 36 in communication, via the port 39 with the outer zone 40a and the port 35 is placed in communication with the exhaust outlet 41a of the valve 41. In consequence the piston 34 and with it the plunger element 12 reverses its motion and, in this reverse motion successive back-flow chambers are defined and back-flow continues through the filtering sleeve 7.

When the piston 34 and the plunger element 12 reach the uppermost limit of their strokes (as seen in FIG. 1 of the drawings) and, should the blockage in the filter unit 6 continue to cause a predetermined pressure difference between the inner and outer zones 40b and 40a, this pressure difference causes the membrane switch 38 to switch the valve 41 into its second position whereupon the reciprocal motion of the plunger element continues. When, however, and with the plunger element in its uppermost position as shown in FIG. 1 of the drawings, the blockage has been removed sufficiently for the pressure difference between the inner and outer zones 40b and 40a no longer to cause switching of the valve 41 via the membrane switch 38 into its second position then the plunger element 12 will remain in the position shown in FIG. 1 of the drawings with the upper end of the rod 23 sealingly pressed against the sealing surface 33 and its reciprocal displacement will only be resumed once cleaning of the filter unit 6 will be dictated as a result of its renewed blockage.

It will thus be seen that, with the self-cleaning filtration device in accordance with the invention and, as just described by way of example, automatic self-cleaning takes place by the generation of an effective backflow as and when this is required as a consequence of the partial blockage of the filter element. The generation of the cleaning backflow arises out of the successive definition of backflow chambers consequent upon the reciprocal movement of a plunger element with respect to the filter unit. As a consequence of the axial extent of the sealing rings 21 and 22 and their particular axial separation there are invariably created, during the reciprocation of the plunger element, regions which are effectively sealed off from the remaining inner zone of the filtration device whilst at the same time the movement of the plunger element with respect to the filtration sleeve 7 is not accompanied by possible dangers of damage to the filtration sleeve 7 as a consequence, for example, of grit or the like being pushed into the filtration sleeve 7 by the plunger element.

The plunger rod 23, in addition to transmitting the reciprocating drive to the plunger body also serves as virtual hydraulic valve. Thus, as long as the upper end of the plunger rod 23 is pressed against the sealing surface 23 flushing throughflow is prevented. When however the rod end moves away from the sealing surface 23 flushing throughflow can take place.

By providing a plurality (e.g. two) of plunger bodies which are axially spaced apart and coupled together by means of a plunger rod, the stroke of the piston and in consequence of the plunger rod can be correspondingly reduced.

The filtration sleeve can be formed of nylon gauze or the like whilst the clamping sleeve can be formed of stainless steel. For very coarse filtration the gauze can be dispensed with and use is made solely of the perforated clamping sleeve.

I claim:

1. A self-cleaning filtration device comprising a casing; a device inlet and a device outlet formed integrally with said casing; a cylindrical filter structure mounted in said casing and defining an inner zone in communication with said device inlet, and also defining with the adjacent walls of the casing an outer zone in communication with said device outlet whereby all flow from said device inlet to said device outlet passes through said filter structure, said structure including an axial stack of annular support elements, each support element comprising a flange portion and an inwardly located axially directed skirt portion, and a sleeve-like filter element surrounding said axial stack and bearing against the outermost edges of said flange portions, at least one plunger body reciprocatably displaceable in said filter structure and including a pair of axially spaced apart sealing rings of such axial extent and respective axial separation as to ensure that at all times sealing contact is maintained between said rings and a pair of successive skirt portions and so as to define with each such successive pair of skirt portions, a backflow chamber substantially sealed from said inner zone; communication means associated with said plunger element for rendering said chamber in communication with a backflow outlet so as to allow for backflow from said outer one through the filtering structure via said chamber to the backflow outlet and displacing means for reciprocatably displacing said plunger body in said structure.

2. A self-cleaning filtration device according to claim 1 wherein there are defined in said body backflow passages; one or more backflow inlets formed in said body intermediate said sealing rings, said backflow passages communicating on the one hand with said backflow inlets and, on the other hand with said communication means.

3. A self-cleaning filtration device according to claim 2 and furthermore comprising a tubular plunger rod secured to the plunger body and communicating at one end thereof with said backflow passages, a fixed sealing surface adapted to bear against and seal the opposite end of the plunger rod against fluid outflow therefrom when the plunger body is in one of its terminal positions, said opposite end becoming unsealed and in communication with said outlet in all other positions of said plunger body.

4. A self-cleaning filtration device according to claim 1 wherein said plunger body is formed with through flow passages so as to permit communication between portions of said inner zone on either side of said plunger body.

5. A self-cleaning filtration device according to claim 1 and comprising a plurality of plunger bodies, axially spaced apart and rigidly coupled together.

6. A self-cleaning filtration device according to claim 3 wherein said displacing means comprises a hydraulic motor including said plunger rod slidable in a cylinder formed integrally with said casing, a piston element formed integrally with said rod, hydraulic liquid ports formed in said cylinder on opposite sides of said piston element and coupled to said outer zone, flow and valve means for controlling hydraulic flow to and from one or other of said ports.

7. A self-cleaning filtration device according to claim 6 wherein the opposite open end of said rod extends into a cylinder extension sealed off from said cylinder, formed with a backflow outlet and provided with said sealing surface.

8. A self-cleaning filtration device according to claim 7 wherein said hydraulic motor is provided with pressure sensitive means responsive to a predetermined pressure differential between said inner and outer zones so as to actuate said motor and reciprocatably displace said plunger element until said pressure differential drops below said predetermined level.

9. A self-cleaning filtration device according to claim 8 wherein said pressure sensitive means comprises a pressure sensitive membrane switch responsively coupled to said valve, one side of said membrane switch being coupled to said outer zone, the other side of said membrane switch being coupled to said inner zone.

10. A self-cleaning filtration device according to claim 9 wherein there is formed in an end cap of said cylinder extension a coupling port arranged to be coupled to said membrane switch an arranged to be in communication with said inner zone when the adjacent end of said tubular plunger rod abuts said cap.

11. A self-cleaning filtration device according to claim 9 wherein there is formed in said cylinder at a position thereof remote from said cylinder extension a limit switch adapted to be abutted by said piston so as to actuate the application of hydraulic pressure via said valve.

* * * * *